United States Patent
Gabel et al.

(10) Patent No.: US 12,351,501 B2
(45) Date of Patent: Jul. 8, 2025

(54) GLASS CERAMIC ARTICLE, METHOD FOR PRODUCING SAME, AND USE THEREOF

(71) Applicant: SCHOTT AG, Mainz (DE)

(72) Inventors: Falk Gabel, Schlangenbad (DE); Roland Dudek, Bad Kreuznach (DE); Evelin Weiss, Mainz (DE)

(73) Assignee: SCHOTT AG, Mainz (DE)

(*) Notice: Subject to any disclaimer, the term of this patent is extended or adjusted under 35 U.S.C. 154(b) by 265 days.

(21) Appl. No.: 17/364,109

(22) Filed: Jun. 30, 2021

(65) Prior Publication Data

US 2021/0403365 A1  Dec. 30, 2021

(30) Foreign Application Priority Data

Jun. 30, 2020 (DE) ................ 10 2020 117 213.3

(51) Int. Cl.
*C03B 32/02* (2006.01)
*C03C 10/00* (2006.01)

(52) U.S. Cl.
CPC .......... *C03B 32/02* (2013.01); *C03C 10/0027* (2013.01); *C03C 10/0054* (2013.01); *C03C 2204/00* (2013.01)

(58) Field of Classification Search
CPC . C03B 32/02; C03C 10/0027; C03C 10/0054; C03C 2204/00
See application file for complete search history.

(56) References Cited

U.S. PATENT DOCUMENTS 3,936,287 A  2/1976 Beall
5,084,328 A  1/1992 Fine
(Continued)

FOREIGN PATENT DOCUMENTS

CN  1459653  12/2003
CN  1506331  6/2004
(Continued)

OTHER PUBLICATIONS

DE-102010023407-A1 Machine Translation (Year: 2010).*
(Continued)

*Primary Examiner* — Travis M Figg
(74) *Attorney, Agent, or Firm* — Ruggiero McAllister & McMahon LLC

(57) ABSTRACT

Sheet-like glass ceramic article are provided that include surfaces with a thickness between the surfaces between 0.5 mm and 1.9 mm and a core. The articles have a first microstructure provided on each of the surfaces and have a second microstructure in the core with a second thickness ($d_2$). The first microstructures extend inwardly from the surfaces towards the core and has a first thickness ($d_1$). The first microstructure has a difference from the second microstructure selected from a group consisting of: a crystalline phase type, a crystalline phase amount, crystalline phase size distribution, crystalline phase orientation, crystalline phases composition, crystalline inclusion, an amorphous phase type, an amorphous phase percentage amount, an amorphous phase composition, and any combinations thereof. The difference results in a first coefficient of linear thermal expansion of the first microstructure that is smaller than a second coefficient of linear thermal expansion of the second microstructure.

22 Claims, 1 Drawing Sheet

(56) References Cited

U.S. PATENT DOCUMENTS

| | | | |
|---|---|---|---|
| 5,377,615 | A | 1/1995 | Detaint |
| 6,124,223 | A | 9/2000 | Beall |
| 8,765,262 | B2 * | 7/2014 | Gross ................ C03C 3/083 |
| | | | 501/63 |
| 10,189,741 | B2 | 1/2019 | Beall |
| 2003/0228759 | A1 | 12/2003 | Uehara |
| 2004/0070120 | A1 | 4/2004 | Doehring |
| 2006/0166804 | A1 | 7/2006 | Sprenger |
| 2007/0259767 | A1 * | 11/2007 | Siebers ............ C03C 10/0027 |
| | | | 501/59 |
| 2009/0018007 | A1 | 1/2009 | Siebers |
| 2012/0135848 | A1 | 5/2012 | Beall |
| 2013/0045375 | A1 | 2/2013 | Gross |
| 2016/0122226 | A1 * | 5/2016 | Hunzinger ........... C03B 23/047 |
| | | | 428/141 |
| 2016/0137549 | A1 * | 5/2016 | Meiss ............... B32B 17/1077 |
| | | | 427/532 |
| 2016/0176752 | A1 * | 6/2016 | Gabel ................. C03C 23/007 |
| | | | 501/4 |
| 2017/0215231 | A1 * | 7/2017 | Doerk ................. F24C 15/105 |
| 2017/0215236 | A1 * | 7/2017 | Doerk .................. C03C 3/097 |
| 2017/0341974 | A1 | 11/2017 | Beunet |
| 2018/0037493 | A1 * | 2/2018 | Schneider ............ C04B 35/195 |
| 2018/0297887 | A1 * | 10/2018 | Spier .................... C03B 32/00 |
| 2019/0195510 | A1 * | 6/2019 | Weiss .................... C03C 4/10 |
| 2021/0230049 | A1 | 7/2021 | Fan |

FOREIGN PATENT DOCUMENTS

| | | | | |
|---|---|---|---|---|
| CN | 1684918 | 10/2005 | | |
| CN | 101269910 | 9/2008 | | |
| CN | 106989422 | 7/2017 | | |
| DE | 102010023407 A1 * | 12/2011 | ......... | C03C 10/0027 |
| DE | 102010023407 B4 * | 2/2017 | ......... | C03C 10/0027 |
| DE | 102016101066 | 2/2017 | | |
| DE | 102017123779 | 4/2018 | | |
| EP | 3311947 | 4/2018 | | |
| WO | 2019202333 | 10/2019 | | |
| WO | 2020073254 | 4/2020 | | |

OTHER PUBLICATIONS

DIN EN ISO 11664-4, "Colorimetry—Part 4: CIE 1976 L*a*b* Colour space (ISO 11664-4:2008) English translation of DIN EN ISO 11664-4:2012-06" Jun. 2012, (Covers DIN 5033-3), 12 pages.

Beall, "Ion-Exchange in Glass-Ceramics", Frontiers in Materials, Aug. 23, 2016, vol. 3, Art. 41, 11 pages.

ISO 7991:1987.

Xu, "Theory and clinical practice of restorative dentistry", Beijing: People's Health Publishing House, 1999, ISBN 7-117-03383-5, with English translation.

* cited by examiner

GLASS CERAMIC ARTICLE, METHOD FOR PRODUCING SAME, AND USE THEREOF

CROSS REFERENCE TO RELATED APPLICATIONS

This application claims benefit under 35 USC § 119 of German Application 10 2020 117 186.2 filed Jun. 30, 2020, the entire contents of which are incorporated herein by reference.

BACKGROUND

1. Field of the Invention

The invention generally relates to glass ceramic articles, preferably sheet-like glass ceramic articles, and to a method for producing such glass ceramic articles, and to the use of glass ceramic articles.

2. Description of Related Art

For protecting displays of mobile devices, in particular smartphones or tablet computers, it has been known to use so-called protective glasses or protective covers or cover glasses. These are sheet-like transparent articles which, for example, are made of glass and may in particular be in the form of sheet-like, mostly chemically toughened glass articles. However, other materials than just glass may also be used, and such a "protective glass" or cover may, for instance, also consist of or comprise a transparent plastic or a crystalline substance, for example a monocrystalline material.

Each of these materials has different advantages and drawbacks. Transparent plastics are relatively light-weight and do not break easily, but on the other hand they are very sensitive to scratches. Crystalline materials such as covers made of $Al_2O_3$ (often referred to as "sapphire" or "sapphire glass") exhibit a very high hardness and are therefore very scratch-resistant, but also very brittle and therefore break easily and usually also have a rather high specific weight. Glasses are also prone to breakage, but can be manufactured in such small thicknesses that they possess a certain flexibility, and furthermore the disadvantage of their high weight compared to plastics is not so pronounced. Moreover, they are scratch-resistant compared to plastics. Therefore, vitreous or glassy materials are very often used for producing protective glasses. In this case, these glassy materials are designed such that they can be chemically toughened, since this further improves the mechanical properties of the resulting sheet-like glass article, in particular the wear resistance of the glass article.

However, such chemical toughening is not only complex to implement in terms of process technology, but also has the drawback that a toughened glass article can no longer be cut. It is also known that in the case of very strongly toughened glass articles, mostly a very fine crumbly fracture pattern is obtained. Indeed, this is advantageous considering the fact that no large, sharp-edged fragments are obtained and the risk of injury is thus reduced. On the other hand, in the event of breakage failure, the transparency of such a broken glass is significantly impaired. This can be a drawback, especially for display applications.

Glass ceramics, in particular so-called zero expansion glass ceramics, have been known as viewing glasses, but in hot applications such as furnace viewing windows. Such viewing windows are usually several millimeters in thickness. Because of this great thickness and the resulting high weight, they were therefore not suitable for use in mobile devices so far.

Moreover, glass ceramics are also disadvantageous for use as cover glasses because glass ceramics include small crystals or crystallites. Due to the presence of these crystallites in the material, which cause some scattering—in particular due to differences in the refractive index and less because of the size of the crystals or crystallites—the transparency of or view through a glass ceramic is impaired compared to a homogeneous material such as an amorphous glass or a single crystal, so that, for example, the representation of very fine, small patterns on a high-resolution display cannot be perceived equally well through a glass ceramic.

However, in contrast to the known materials that are used for so-called covers, glass ceramics could offer certain advantages. For example, glass ceramics are known to be high strength materials.

For example, high-strength glass ceramics are described in DE 10 2016 101 066 B3. However, such glass ceramics have only been known in significantly greater thicknesses so far. In principle, the precursor glasses of such glass ceramics can also be made thinner. However, hitherto it has not been known whether such thin precursor glasses can also be converted into a glass ceramic in such a way that the advantageous microstructure as known from thicker glass ceramics can be obtained. This is because it is assumed that the formation of such a microstructure also depends on the heating and cooling rates of the glass ceramic material and on the setting of a temperature gradient between surface and bulk of a molded body made of or comprising a glass ceramic material. It has therefore been assumed that a reduction in thickness would mean that an intrinsically toughened microstructure cannot be obtained.

Furthermore, it has been known to obtain glassy and also glass ceramic materials by toughening, for example by chemical toughening. A good overview of the related prior art can be found in Beall et al., Ion-Exchange in Glass-Ceramics, Frontiers in Materials, August 2016, Vol. 3, Art. 41, inter alia. For example, glass ceramics can be chemically toughened by ion-exchange involving the glassy phase, especially if the respective green glass itself is an ion-exchangeable glass, such as Gorilla® glass. Other toughening mechanisms are known, which may involve an alteration in the composition of the crystalline phase, for example, by recrystallization or decrystallization. However, the glass ceramics described relate to very different materials with very different properties, especially different optical properties. In fact, the described glass ceramics are often opaque or colored or at least have a distinct color tint, so that they do not appear to be suitable for use as a protective glass for mobile devices.

There is thus a need for glass ceramic materials which at least mitigate the aforementioned deficiencies of the prior art, in particular which are designed such that they can be used as protective glasses for mobile devices.

SUMMARY

The disclosure thus relates to a sheet-like glass ceramic article having a thickness between 0.5 mm and 1.9 mm, which has surfaces and a core located between the surfaces, wherein a first microstructure is provided on each of the surfaces, which extends inwardly from the surface towards the core and has a thickness $d_1$, and wherein the core defines a second microstructure with a thickness $d_2$, wherein the first microstructure is distinguished from the second microstructure by the type and/or the amount and/or the size distribution and/or the orientation and/or the composition of the crystalline phases and/or crystals included in the respective microstructure, and/or by the type and/or or the percentage amount and/or the composition of an amorphous, for example glassy phase, so that, preferably, a difference is resulting in the resulting coefficients of linear thermal expansion of the first microstructure and of the second microstructure, with the coefficient of linear thermal expansion of the first microstructure preferably being smaller than the coefficient of linear thermal expansion of the second microstructure.

Such a configuration of a sheet-like glass ceramic article has a number of advantages.

The thickness of between 0.5 mm and 1.9 mm of the glass ceramic article is sufficiently thin to still obtain an acceptable specific weight of the protective glass or cover. A mobile device equipped with such a glass ceramic article, for example, will still have a sufficiently low overall weight.

The glass ceramic article has surfaces, and surfaces referring to the main surfaces of a sheet or a sheet-like body, here. In the context of the present disclosure, a sheet-like body or, more generally, a sheet-like article or product refers to a geometric configuration of the body (or of the article or product) such that its lateral dimension in one spatial direction of a Cartesian coordinate system is at least one order of magnitude smaller than in the other two spatial directions perpendicular to this first spatial direction. Usually, the smallest lateral dimension is also referred to as the thickness or height of a body, and the other two lateral dimensions, which are perpendicular to the thickness or height, are referred to as the length and the width. The length and width of the sheet-like body may be of the same order of magnitude or may also be different, and in the latter case the length is usually the largest lateral dimension of the body (or article or product). A sheet-like body in the sense of the present disclosure may therefore be a sheet, for example, but also a ribbon, such as a glass ribbon.

In the context of the present disclosure, thickness may refer to the lateral dimension of a body, such as of the sheet-like glass ceramic article according to the present disclosure, for example, on the one hand.

However, within the context of the present disclosure, thickness may also relate to the lateral dimensions of the microstructure of a body, in particular of the microstructure of the glass ceramic article according to embodiments of the present disclosure. For example, within the context of the present disclosure, reference may be made to the thickness of a microstructure. In this case, the thickness of the microstructure is understood to refer to a portion of the thickness of the entire body. Generally, within the context of the present disclosure, the thickness of the entire body will be designated by the letter "d". Thicknesses of microstructures will generally be designated with an index, such as "$d_1$" for the thickness of a first microstructure, for example.

In the context of the present disclosure, main surfaces of a body such as a product or article are understood to mean those surfaces of a body, which together make up more than 50% of the total surface area of the body. For a sheet-like article or a sheet-like product, these will generally be the surfaces which are defined by the length and width of the body. Depending on the precise spatial arrangement of the sheet-like body, these surfaces are also referred to as upper and lower surfaces or as the front and rear surfaces thereof. The surfaces of the sheet-like glass ceramic article preferably extend substantially parallel to one another. This is understood to mean that the angle enclosed between the normal vectors of the two surfaces is not more than 5°. The parallelism can be further improved by polishing the surfaces, in particular after chemical toughening, for example.

Thus, the sheet-like glass ceramic article according to the present disclosure has surfaces which can also be referred to as the upper and lower surfaces. Between these two surfaces, the core of the sheet-like glass ceramic article is located, which is understood to mean an inner zone of the sheet-like glass ceramic article. A first microstructure is provided on each of the surfaces of the sheet-like glass ceramic article.

In the context of the present disclosure, microstructure is understood to mean the configuration of a volume, such as the volume of a body and/or of an area and/or of a portion of a body, for example. This configuration relates to the chemical and/or mineralogical composition of the considered volume, for example. What is in particular relevant for a microstructure are the size and/or the type of possibly included crystalline constituents and/or their chemical composition and/or their spatial arrangement relative to one another.

The first microstructure of the glass ceramic article extends inwardly from a surface towards the core and has a thickness $d_1$. The core defines a second microstructure with a thickness dz. The first microstructure differs from the second microstructure in the type and/or the amount and/or the size distribution and/or the orientation and/or the composition of the crystalline phases and/or crystals included in the respective microstructure, and/or by the type and/or the percentage amount and/or the composition of an amorphous, for example glassy, phase (or a plurality of amorphous, e.g. glassy, phases), so that preferably a difference results in the resulting coefficients of linear thermal expansion of the first microstructure and of the second microstructure.

Generally, a glass ceramic may be configured so as to have the following microstructure, from the surface into the bulk: a largely amorphous, e.g. glassy, zone near the surface; a zone comprising high-quartz solid solution as a crystal phase, in particular as the major or predominant or even as the sole crystal phase; a zone comprising both high-quartz solid solution and keatite solid solution as crystal phases, in particular as main crystal phases; a zone comprising keatite solid solution as a crystal phase, in particular as the major or predominant or even as the sole crystal phase.

A zone may also be referred to as a microstructure, however, it is also possible that a zone and a zone adjoining this first zone are jointly considered as a microstructure.

As far as a first and a second microstructure are mentioned in the context of the present disclosure, these are not meant to be the microstructures or subsequent microstructure zones as viewed from the surface of the glass ceramic to the bulk. Rather this refers to one microstructure and to a further microstructure, and such microstructure may also include a plurality of zones. The microstructures of a glass ceramic considered in the context of the present application are those microstructures which, due to their structure, their composition, their phase content, and the like are essentially responsible for the highly advantageous mechanism of increasing strength as relevant for the glass ceramics according to embodiments.

It is in particular possible that a glass ceramic and/or a zone encompassed in the glass ceramic and/or a microstructure encompassed in the glass ceramic may include a plurality of amorphous, for example glassy phases.

In the context of the present disclosure, the term composition can in particular be understood as the chemical composition of a material and/or of a phase included in the material.

In the context of the present disclosure, chemical composition is understood to mean the composition of the glass ceramic material as resulting in particular from the chemical analysis. It is usually given in percent by weight, on an oxide basis.

However, it is also possible that composition relates to the crystallographic composition of a material.

In the context of the present disclosure, crystallographic composition is understood to mean the composition of a material with regard to the crystal phases (or crystalline phases) included in the considered material (such as a glass ceramic material), as can be determined by X-ray diffraction studies, for example. Here, the type of the phases included in the respective examined material such as a glass ceramic material may be particularly noteworthy, as well as the amount of these phases and the ratio of different phases to one another.

This implementation has the technical effect that a product is obtained, namely the sheet-like glass ceramic article in the present case, in which different stress states can be adjusted by targeted, i.e. selective adjustment of the microstructures which are included in the sheet-like glass ceramic article.

The coefficient of linear thermal expansion of the first microstructure is preferably lower than the coefficient of linear thermal expansion of the second microstructure.

This is particularly advantageous, because it allows to obtain a microstructure that results in a glass ceramic article which, due to the different coefficients of linear thermal expansion, can also be referred to as "compressive stress toughened". Therefore, such a glass ceramic article exhibits particularly high mechanical strength, which is revealed by high strengths in ball drop tests, for example. However, the glass ceramic article is not necessarily toughened in the conventional sense, here. It is in particular contemplated according to one embodiment, that no chemical toughening by ion exchange nor thermal toughening by thermal treatment with rapid cooling is performed. Rather, the "compressive stress" of such a glass ceramic article according to one embodiment results from the intrinsic structure of the glass ceramic article and the spatial arrangement of the crystalline phases and the residual glass phase and their distribution across the volume of the glass ceramic article and arises during the cooling process of the so-called ceramization process, meaning it is a result of the entire ceramization process. However, it is also possible and may even be preferred to selectively vary the chemical composition of the phases defining the first and second microstructures or included in the respective microstructure, such as the amorphous, e.g. glassy phase or phases, and/or the crystalline phase or the crystalline phases. This may be achieved by an ion exchange, for example, but it is also conceivable and may even be preferred that such a selective variation of the chemical composition in the first and second microstructures is brought about by the temperature control during nucleation and crystallization.

Such a design of a glass ceramic article not only results in a high mechanical strength of the glass ceramic article in a ball drop test. Rather, it has also been shown that such a glass ceramic article exhibits a high level of strength in the case of sharp impact loads as well. These are loads where the impact occurs on small pointed particles. Such small pointed particles are particularly critical with regard to the wear resistance of sheet-like articles which are particularly suitable for use as protective glasses (or covers) for mobile devices such as smartphones or tablet computers. This is because these small pointed particles might penetrate the surface of such a cover, and the stress field generated by these particles in the article can lead to critical crack growth, i.e. to glass breakage. Especially for chemically toughened glass articles it has been found that such small pointed particles or the stress field generated thereby is able to penetrate through the surface layer which is under compressive stress, and to penetrate into the inner zone of such a glass article, which is under tensile stress, which then usually leads to glass breakage.

Surprisingly, it has been found that this is not the case with the glass ceramic article considered here. Rather, it has been found that cracks caused by surface damage do not necessarily and usually will not propagate into the inner zone of the glass ceramic article (i.e. into the core). Rather, the crack is deflected, which occurs in particular at the boundary between the first microstructure and the second microstructure. The inventors assume that this boundary may form where a compressive stress zone has developed due to the gradient of the thermal expansion coefficient in the glass ceramic.

The reason for this highly advantageous property of the glass ceramic article is not fully understood. Several causes alone or different combinations thereof could be responsible for the observed effect, which can be achieved with the solution approach that will be described in more detail below.

It could be that a root cause for this crack deflection lies in the fact that the glass ceramic article comprises crystalline phases and preferably a residual glass phase. In fact, the crack might be deflected along phase boundaries such as along grain boundaries, for example. However, it is noteworthy that the crack deflection in the glass ceramic article considered here preferably occurs substantially parallel to the surfaces of the glass ceramic article. In particular, the crack deflection may occur in a way such that the crack runs essentially along the interface between the first and second microstructures.

One of the advantages of such a glass ceramic article can be that, unlike chemically or thermally toughened glass articles, the glass ceramic article according to preferred embodiments is accessible to a cutting process, despite its microstructure which gives the glass ceramic article a kind of "compressive stress toughening" as mentioned above. Thus, despite of the microstructure with a kind of "compressive stress toughening", the configuration of the presently considered glass ceramic article according to embodiments is obviously not completely comparable with that of a chemically or thermally toughened glass article. Rather, there are obviously fundamental differences. This applies in particular to glass ceramic articles which are not chemically toughened.

In the context of the present disclosure, the following definitions shall apply:

Glass ceramic article is understood to mean an article or a product which comprises glass ceramics and, for example, may predominantly, i.e. at least 50 wt % thereof, or substantially, i.e. at least 90 wt % thereof, or even entirely consist of glass ceramics. Thus, for example, a glass ceramic article may comprise a glass ceramic sheet and a coating applied on this sheet.

Here, glass ceramic is understood to mean a material which is obtained from a precursor glass, that is a glass which is accessible to controllable and in particular controlled crystallization. Such a precursor glass is also referred to as a ceramizable glass or green glass.

Controllable and in particular controlled crystallization, also referred to as ceramization, is understood to mean that preferably a selective nucleation is or at least can be brought about in a way so that crystals are selectively formed in the volume of the precursor glass such that the type of the crystals and/or the composition of the crystals and/or the size of the crystals and/or the size distribution of the crystals is adjustable or is adjusted. However, it is not necessary here, that the nucleation is performed as a separate process step in a method for producing a glass ceramic according to embodiments. Of course, the composition and/or type of the crystals is dependent on the chemical composition of the starting glass. However, within the limits of these conditions defined by the composition of the starting glass, i.e. the precursor glass or green glass, the crystals being formed can be influenced by the process control during ceramization such that, for example, a particular crystal phase is obtained and another one is suppressed.

The crystals included in a glass ceramic usually only have a small mean grain size, mostly in a range of less than 10 µm. Therefore, they are also referred to as crystallites.

In the context of the present disclosure, crystalline phase or crystal phase is understood to mean a phase that is present in a specific crystal structure that can be determined by X-ray diffraction. A crystalline phase can therefore also be understood as a crystal or crystallite, and crystals or crystallites that are present in a specific crystal structure define a crystalline phase. The crystal structure is also determined by the chemical composition of the crystals or crystallites, so that an X-ray diffraction study usually not only provides information about the crystal structure, but also about the chemical composition of the crystals or crystallites defining or included in the crystalline phase.

In the context of the present disclosure, the coefficient of linear thermal expansion a is specified for the range from 20-300° C., unless expressly stated otherwise. It is the mean coefficient of thermal expansion $\bar{\alpha}$ (20° C.; 300° C.) in compliance with or according to ISO 7991:1987. The designations $\bar{\alpha}$, $\bar{\alpha}$ (20° C.; 300° C.), $\alpha$ and $\alpha_{20\text{-}300}$ are used synonymously in the context of the present invention. The specified value is the nominal mean coefficient of linear thermal expansion according to ISO 7991, which is or can be determined in a static measurement. According to the cited specification, the thermal expansion coefficient is determined in duplicate. For practical reasons, however, values for the coefficient of thermal expansion are sometimes determined in a single determination. These are then determined according to the cited specification. In the present document, as a rule, unless expressly stated otherwise, the expansion coefficient is obtained or specified in compliance with the standard.

According to one embodiment of the glass ceramic article, the latter exhibits an optical transmittance ($\tau_{vis}$) of at least 85%, preferably more than 85%, based on a thickness of the glass ceramic article of 1 mm.

This is advantageous because in this way the visibility of display elements arranged behind the glass ceramic article, such as screens, in particular high-resolution screens, is excellent.

In the context of the present document, transmittance or optical transmittance refers to the light transmittance between 380 and 780 nm as measured in compliance with DIN 5033.

It is identical to the Y value according to the CIE color system, measured under standard illuminant C, observer angle 2°. This light corresponds to white light with a color temperature of 6800 K and thus represents average daylight.

Such an optical transmittance is preferably achieved by providing the glass ceramic that is encompassed in the glass ceramic article according to embodiments or of which the glass ceramic article is or can be made of predominantly or substantially or even entirely, in the form of a transparent, non-colored glass ceramic. Here, non-colored means that the glass ceramic is not dyed by color-imparting metal ions, i.e. it is not volume-colored, in other words not bulk-tinted. However, it is also possible and may even be preferred for the glass ceramic to have a certain, albeit slight, volume or bulk tint, but preferably with neutral color coordinates of the glass ceramic, so that no color falsification of a display will occur when looking through the glass ceramic. Such an adjustment of transmittance by a certain tinting of a glass ceramic may be preferred in order to prevent dazzling of the operator of a smartphone or of a tablet computer, for example.

In the context of the present invention, transparency refers to a property of a material that essentially results from three factors: The size of scattering particles included in the material. In the case of the present invention, such scattering particles are the crystals or crystallites included in the glass ceramic material. The difference in refractive index between an enclosing matrix and particles embedded therein. In the case of glass ceramic material, the matrix is glass and the particles embedded therein are crystallites or crystals. Birefringence of the material. In the case of a glass ceramic material, the birefringence of the crystallites has in particular to be considered here.

In this sense, a glass ceramic material is transparent if the crystallite size is smaller than the wavelength of the light, if the difference between the refractive indices of the phases included in the material such as the main crystal phase and the surrounding, often glassy matrix, is as small as possible, and if the phases included in the material exhibit no or the lowest possible optical anisotropy. Such conditions can be adjusted by smart targeted selection of the composition and controlled crystallization precisely coordinated therewith. The better these conditions are met for a given material, the higher will be the transmittance and the lower will be scattering. The three factors mentioned are interrelated such that a more of one factor can be compensated for by a less of another factor or of two other factors. For example, a merely small difference in the refractive index between the matrix and the crystal can possibly compensate for high birefringence.

In the context of the present invention, the transparency of a material such as a glass ceramic material has to be understood not only with respect to a lowest possible absorption coefficient for electromagnetic radiation in the wavelength range from 380 to 780 nm. In the present case, the transparency of a material such as a glass ceramic material is also influenced by a lowest possible scattering of electromagnetic radiation in the wavelength range from 380 to 780 nm, in particular at wavelengths of 440 nm (blue LED), 520 nm (green LED), and 634 nm (red LED).

According to a further embodiment of the glass ceramic article, scattering as determined in transmission is not more than 3%, preferably not more than 2%, based on a thickness of the glass ceramic article of 1 mm.

In the context of the present invention, the scattering of a material is determined using a Lamda950 UV/Vis spectrometer from Perkin Elmer with an integrating sphere of 150 mm, also known as Ulbricht sphere. A separation of transmittance, scattering, and reflection is achieved by placing the sample within the integrating sphere and conducting a plurality of measurements per sample, in which the components not relevant for the scattering (transmission and reflection) are removed from the sphere and thus detracted from the measurement. This procedure provides for an exact measurement of the percentage of scattered light as a function of wavelength. The percentage of scattered light at 634 nm, which corresponds to the wavelength of red LEDs, has proven to be particularly representative for assessing scattering or haze.

Such a configuration of the glass ceramic article is particularly advantageous because it provides for particularly good transparency of or view through the glass ceramic article, for example onto a display element arranged behind the glass ceramic article.

According to one embodiment, the glass ceramic article is characterized by a crack initiation load (CIL) between 0.5 N and 1.0 N, preferably determined for a thickness d of the glass ceramic article of 1.9 mm.

According to a further embodiment, at least one of the surfaces of the glass ceramic article is polished, for example mechanically polished, and has a roughness of not more than 0.2 nm (RMS and $R_a$). It can be assumed that the polished surface even has a significantly lower roughness, However, the raw glass, i.e. the glass obtained before the polishing steps, preferably already has a very low roughness, close to the measuring limit of measurement devices usually used for roughness determination, e.g. atomic force microscope (AFM).

Such an implementation is advantageous because a low atomic force microscope roughness minimizes the scattering of visible light on the surface of the glass ceramic article. This improves the visibility of display elements arranged behind the glass ceramic article.

According to a further embodiment, sparkle is less than 0.65, preferably at most 0.1, most preferably not more than 0.09, or less, determined for a display with 190 dpi.

Sparkle (which may also be referred to as glitter or iridescence) is an effect that often occurs on textured surfaces or two-phase transparent materials, especially on surfaces that are designed to be glare-free or at least to reduce glare. This effect is in particular also known from screen protector films that have an anti-glare effect. The viewer perceives irregular patterns in the form of differently colored small dots. Since this reduces the perception of displayed content, sparkle should be limited. Advantageously, it is less than 0.65, preferably less than 0.1, most preferably at most 0.09 or less, determined for a display with a resolution of 190 dpi. Sparkle can be determined using the SMS1000 test device from DM&S and is measured with this device.

The measurement method is as follows: A first image of the measurement object is taken and recorded using a camera. The glass ceramic article is slightly shifted laterally, and a second image is taken. The sparkle is assessed by comparing the two images by subtracting them from each other and then dividing the standard deviation of the gray levels by the mean gray value of the reference measurement. The reference measurement for a glass ceramic article is performed on a glass article.

According to a first aspect, the glass ceramic article comprises a glass ceramic material comprising the following constituents, in wt %, on an oxide basis:

| | |
|---|---|
| $Al_2O_3$ | 18 to 23 |
| $Li_2O$ | 2.5 to 4.2 |
| $SiO_2$ | 60 to 69 |
| $ZnO$ | 0 to 2 |
| $Na_2O$ | 0 to 1.5 |
| $K_2O$ | 0 to 1.5 |
| $Na_2O + K_2O$ | 0.2 to 1.5 |
| $MgO$ | 0 to 1.5 |
| $CaO + SrO + BaO$ | 0 to 4 |
| $B_2O_3$ | 0 to 2 |
| $TiO_2$ | 2 to 5, preferably to 3 |
| $ZrO2$ | 0.5 to preferably 2.5 |
| $P_2O_3$ | 0 to 3 |
| $R_2O_3$ | 0 to 1, with R = lanthanide, preferably Nd |
| $MnO_2$ | 0 to 0.3 |
| $Fe_2O_3$ | 0 to 0.3 |
| $SnO_2$ | 0 to preferably less than 0.6, more preferably less than 0.5, | wherein the glass ceramic material may furthermore comprise refining agents, and wherein the total of $TiO_2+ZrO_2+SnO_2$ amounts to between 3.8 and 6 wt %.

Non-colored variants of the glass ceramic material may preferably include about 120 to 200 ppm, more preferably up to 140 ppm of $Fe_2O_3$. More generally, however, it is possible that the $Fe_2O_3$ content of the glass ceramic material, in particular also in a non-colored variant of the glass ceramic material, can be up to 0.3 wt % without exhibiting a disruptive tint.

Here, the components $Li_2O$, $Al_2O_3$, and $SiO_2$ form the basic constituents of the crystal phase.

A composition as listed above is advantageous in particular because an amount of nucleating agents which is the total of the amounts of $TiO_2$, $ZrO_2$, and $SnO_2$ and is at least 3.8 wt % allows to achieve ceramization durations of less than 5 hours in total. Both the amount of $TiO_2$ as an individual component and the total amount play an important role here. For $TiO_2$, the upper limit results from the adverse effect on the inherent color of the glass ceramic. For $ZrO_2$ and $SnO_2$, the preferred upper limits result from the devitrification tendency which increases strongly with larger amounts and which might make shaping difficult.

The alkali oxides $Na_2O$ and $K_2O$ are used to adjust the viscosity and to improve the melting behavior, however, their total amount has to be limited, as listed above, in order to limit as far as possible the formation of undesired secondary phases.

MgO in fact promotes the formation of keatite solid solution, i.e. it causes a reduction in the maximum ceramization temperature, but at the same time causes the formation of undesired secondary phases, in particular crystalline phases of complex mixed metal oxides, for example spinel or magnesium titanate. On the one hand, this has an adverse effect on the scattering of the glass ceramic material, and on the other hand it also leads to an increase in the coefficient of thermal expansion.

Other alkaline earth oxides may contribute to an adjustment of the viscosity and, optionally, to a reduction in the percentage of scattered light.

$B_2O_3$ allows to significantly reduce the temperatures for ceramization and for hot subsequent processing, in particular the maximum ceramization temperature and the shaping temperatures. Fluorine has a similar effect as well.

$P_2O_5$ can be used to improve glass formation, however, in quantities of more than 3 wt % it will cause an impairment of transmission by increasing the scattering.

It has been observed that iron oxide $Fe_2O_3$ can accelerate the formation of keatite, i.e. it also acts as a nucleating agent. An $Fe_2O_3$ content of up to a maximum of 0.3 wt % is therefore permissible. Higher contents, however, lead to an undesirably strong yellow tint of the glass ceramic material.

The glass ceramic material according to the first aspect is preferably neither selectively tinted by added color-imparting oxides, for example oxides such as $MnO_2V_2O_5$, $MoO_x$, NiO, $Cr_2O_3$, $Nd_2O_3$, and/or CoO, nor does it contain any other color-imparting constituents to a significant extent, i.e. more than 0.1 wt % in each case. Small amounts of $V_2O_5$ or preferably $Nd_2O_3$ may, however, be used to correct the color coordinates. For example, a light blue tint is often perceived as more pleasant than a respective yellow tint.

According to one embodiment, the glass ceramic may comprise a total of up to 0.08 wt % of color-imparting oxides, preferably up to at most 0.01 wt %.

However, more generally, without being limited to the glass ceramics according to the first aspect, it is possible and may even be preferred for the glass ceramic according to one embodiment to be at least tinted, in particular by added color-imparting oxides. Such coloring oxides may include $MnO_2$, $V_2O_5$, $Cr_2O_3$, NiO, CoO, $Nd_2O_3$, $MoO_3$, for example.

$SnO_2$ and MnO may be employed to promote refining. Furthermore, the refining agents as commonly known from glass processing such as $As_2O_3$, $Sb_2O_3$, $SO_4^-$, $Cl^-$, $CeO_2$ can be used in total amounts of up to a maximum of 2 wt %. For reasons of environmental protection, $SnO_2$ is preferred for the refining.

According to a further embodiment according to the first aspect, the glass ceramic material includes a ratio of $TiO_2$+$SnO_2$ to $ZrO_2$ of 1-11, preferably 1.2-6.5, based on percentage by weight.

Particularly preferably, the content of substances that are harmful to the environment or health, such as arsenic, antimony, cadmium, lead, and/or halides, is less than 0.1 wt % in each case, based on the total mass of the glass ceramic material.

According to an embodiment of the glass ceramic article according to the first aspect, the first microstructure comprises high-quartz solid solution as the main crystal phase, preferably with a crystallite size from 0.01 μm to 0.1 μm, and/or the second microstructure comprises keatite solid solution as the main crystal phase, preferably with a crystallite size from 0.05 μm to 0.8 μm, with main crystal phase referring to a crystal phase that is present in a fraction exceeding 50 vol % of the total of crystal phase fractions.

This is advantageous because in this way a microstructure is obtained in a particularly simple manner, which can be referred to as compressive stress toughened. This is because the first microstructure has a lower coefficient of thermal expansion than the second microstructure. As a result, a compressive stress arises in the near-surface first layer, i.e. in the first microstructure close to the surface, during the cooling process which is part of the ceramization process.

Such a design of the glass ceramic article is furthermore preferred because a transparent article is obtained in this way, which may exhibit improved chemical resistance compared to conventional toughenable glasses.

According to a further aspect, the glass ceramic article comprises a glass ceramic material that includes the following constituents, in wt %, on an oxide basis:

| | |
|---|---|
| $SiO_2$ | 45 to 62 |
| $Al_2O_3$ | 20 to 40 |
| MgO | 5 to 16 |
| $Li_2O$ | 0.3 to 6 |
| $TiO_2$ | 0 to 10 |

-continued

| | |
|---|---|
| $MoO_3$ | 0 to 2 |
| $ZrO_2$ | 0 to 4 |
| $B_2O_3$ | 0 to 1 |
| $P_2O_5$ | 0 to 1 |
| $Nd_2O_5$ | 0 to 0.2, | wherein the glass ceramic material may comprise $WO_3$, $SnO_2$, $Ta_2O_5$, and/or $Nb_2O_5$, or mixtures thereof, preferably with a total of the contents of $TiO_2$, $MoO_3$, $ZrO_2$, $WO_3$, $SnO_2$, $Ta_2O_5$, and/or $Nb_2O_5$ between at least 0.1 wt % and at most 6 wt %, and wherein the glass ceramic material may furthermore comprise refining agents, in particular $As_2O_3$, in particular up to 1.5 wt % of $As_2O_3$.

Suitable chemical compositions of glass ceramic materials according to the second aspect can be found, for example, under Applicant's own application number DE 10 2017 123 779 A1. However, in contrast to the glass ceramic materials described in DE 10 2017 123 779 A1, the present application contemplates a different crystallographic composition of the glass ceramic materials, in particular since the glass ceramic materials according to DE 10 2017 123 779 A1 are white and opaque.

According to the second aspect, the glass ceramic article is preferably designed such that the glass ceramic material comprises high-quartz solid solution as the main crystal phase, wherein the crystal phase fraction in the glass ceramic material preferably is at least 45 vol % and particularly preferably at most 90 vol %, and wherein the fraction of amorphous, in particular glassy phase(s) is preferably at least 10 vol % and particularly preferably at most 55 vol %, wherein the lithium content in the first microstructure is higher than in the second microstructure. The high-quartz solid solution is preferably a magnesium-containing or magnesium-rich high-quartz solid solution. This is preferred because it has been found that ion exchange is possible in this way.

For this purpose, it can be advantageous if the magnesium content in the glass ceramic material is higher than the lithium content. It has in particular been found that a molar ratio of MgO to $Li_2O$ of greater than 3.2 can be advantageous for obtaining a particularly magnesium-rich crystal phase. The latter is then more easily accessible to a lithium ion exchange. In the context of the present disclosure, lithium ion exchange is understood to mean that ions of a material, such as a glass ceramic material in the present case, are exchanged by lithium ions. In other words, in the lithium ion exchange lithium ions are integrated into the material, in this case the glass ceramic material. More generally, when an exchange takes place for a component "X", a so-called "X exchange", the component X is integrated into the material, and another component from the material is released into a so-called "exchange bath", for example, such as a molten salt.

In other words, according to this embodiment, the glass ceramic article according to the second aspect is designed such that the first microstructure differs from the second microstructure with regard to the chemical composition, specifically with regard to the lithium content, i.e. the amount of $Li_2O$ which is increased in the first microstructure compared to the second microstructure which may also be referred to as "bulk" here. This can be seen in particular in ToF-SIMS examinations, for example.

For producing this advantageous microstructure according to the second aspect, it may in particular be contemplated to perform an ion exchange, in particular a lithium ion exchange, preferably by or in a molten lithium salt, in particular molten lithium sulfate, preferably with a selected temperature of the molten salt of more than 500° C., in particular more than 700° C., and most preferably 725° C. The duration of the ion exchange may range between at least 30 minutes and up to 8 hours.

The inventors assume that the ion exchange does not take place predominantly in the amorphous, for example glassy phase(s) included in the near-surface first microstructure, but rather predominantly in the main crystal phase included in the first microstructure. In this way, a difference is obtained in the thermal expansion coefficients of the crystalline phases, in particular the main crystalline phases, of the first and second microstructure. Thus, the resulting coefficient of thermal expansion in the first microstructure is lower than the coefficient of thermal expansion in the second microstructure. This leads to the advantageous formation of compressive stress on the surface of the glass ceramic.

According to a third aspect of the present disclosure, the glass ceramic article is configured so as to comprise a glass ceramic material that includes the following constituents, in wt %:

| | |
|---|---|
| $Al_2O_3$ | 10 to 40 |
| $CaO + BaO + MgO$ | 0 to 18 |
| $Na_2O + K_2O$ | 5 to 40 |
| $SiO_2$ | 25 to 75 |
| $TiO_2$ | less than 10 |
| $ZrO_2$ | less than 10, | wherein, furthermore, refining agents such as $As_2O_3$ can be included, preferably with a content of $As_2O_3$ of not more than 0.5 wt %, as well as other oxides such as rare earth oxides, in particular $Nd_2O_3$, wherein the $Nd_2O_3$ content preferably is not more than 0.2 wt %, or for example $SnO_2$, wherein the $SnO_2$ content preferably is not more than 0.5 wt %.

Suitable chemical compositions of glass ceramic materials according to the third aspect can also be found in international application WO 2020/073254 A1, for example.

According to the third aspect, the glass ceramic article is preferably designed such that the glass ceramic material comprises nepheline or a nepheline-like crystal phase as the main crystal phase, for example a solid solution having a nepheline structure, wherein the potassium content in the first microstructure is increased compared to the second microstructure. Preferably, the nepheline is a sodium-containing or sodium-rich nepheline solid solution. In particular, it is possible that the crystal phase content in the first microstructure is different from that of the second microstructure. In the first microstructure, it may range between 0.1 and 99 vol %, for example between 1 and 40 vol %, for example from 2 to 15 vol %, and in the second microstructure between 10 and 80 vol %, for example preferably between 20 and 60 vol %, in particular between 35 to 55 vol %. The fraction of the amorphous phase or amorphous phases, for example of the glassy phase or glassy phases, will accordingly be such that the values add up to give 100 vol %.

Such a microstructure may advantageously be obtained, for example, by achieving a potassium ion exchange in a molten potassium nitrate, for example in a molten potassium nitrate at least at 380° C. and at most at 550° C., preferably at most at 500° C., more preferably at most at 450° C. or even only at 420° C., with a duration of the ion exchange between at least 30 minutes and up to eight hours.

The inventors assume that according to the third aspect the advantageous microstructure does not result from a different composition of the crystal phases of the first and second microstructures, but rather from the different ion radii of the sodium ion and the potassium ion. According to the third aspect of the present disclosure it is furthermore assumed that the ion exchange does not take place evenly in the glassy and crystalline phases of the first microstructure, but rather preferably in the crystalline phases, in particular in the main crystalline phase. Due to the larger potassium ion, a compressive stress is resulting in the main crystal phase. In this respect, the mechanism of strength increase according to the third aspect is fairly comparable to the conventional toughening of a glass article. However, the increase in strength is different insofar as, according to the third aspect, it does not take place in an amorphous, for example glassy phase, but rather in a crystalline phase.

According to a fourth aspect, the glass ceramic article is configured so as to comprise a glass ceramic material that includes the following constituents, in wt %, on an oxide basis:

| | |
|---|---|
| $Li_2O$ | 3.0 to 4.5, preferably 3.2 to 4.3 |
| $Na_2O$ | 0 to 1.5, preferably 0.2 to 1.0 |
| $K_2O$ | 0 to 1.5, preferably 0 to 0.8 |
| $Na_2O + K_2O$ | 0.2 to 2.0, preferably 0.3 to 1.5 |
| MgO | 0 to 2.0, preferably 0.1 to 1.5 |
| CaO | 0 to 1.5, preferably 0 to 1.0 |
| SrO | 0 to 1.5, preferably 0 to 1.0 |
| BaO | 0 to 2.5 |
| ZnO | 0 to 2.5, preferably 0 to 2.0 |
| $B_2O_3$ | 0 to 1.0, preferably free of $B_2O_3$ except for inevitable traces |
| $Al_2O_3$ | 19 to 25, preferably 19 to 24 |
| $SiO_2$ | 55 to 69, preferably 60 to 68 |
| $TiO_2$ | 1.4 to 2.7 |
| $ZrO_2$ | 1.3 to 2.5, preferably 1.3 to 2.2 |
| $SnO_2$ | 0 to 0.4, preferably 0 to 0.3 |
| $SnO_2 + TiO_2$ | less than 2.7 and preferably at least 1.3 |
| $P_2O_5$ | 0 to 3.0, preferably 0 to 1.5 |
| $Nd_2O_3$ | 0.001 to 0.4, preferably 0.005 to 0.4, more preferably 0.02 to 0.3 |
| CoO | 0 to 0.005, preferably 0 to 0.004 |
| $Fe_2O_3$ | not more than 0.04 |
| $ZrO_2 + 0.87(TiO_2 + SnO_2)$ | 3.65 to 4.3, | wherein, optionally, additions of chemical refining agents such as $As_2O_3$, $Sb_2O_3$, $CeO_2$ can be included, and/or sulfate, chloride, fluoride compounds in total amounts of up to 2.0 wt %.

According to the fourth aspect, the glass ceramic article is preferably designed such that the glass ceramic material comprises high-quartz solid solution as the main crystal phase, in particular preferably a lithium-rich high-quartz solid solution, with a crystal phase fraction in the glass ceramic material of preferably at least 45 vol %, in particular at least 55 vol %, for example at least 70 vol %, and particularly preferably at most 90 vol %, and with a fraction of the amorphous, for example glassy phase(s) of preferably at least 10 vol % and particularly preferably at most 55 vol %, wherein the crystals of the main crystal phase in the first microstructure are oriented in a directional manner, and wherein the crystals of the main crystal phase in the second microstructure are oriented randomly.

Here, in the first microstructure, the crystallographic c-axes of the crystals or crystallites defining the or included in the main crystal phase are preferably oriented substantially parallel to the normal vector of the surface of the glass ceramic article. In the context of the present disclosure, substantially parallel means that the crystallographic c-axis of a crystal or crystallite encloses an angle of not more than 10°, preferably not more than 5° with the normal vector.

Here, directional orientation is understood to mean that at least 50% of the crystals or crystallites of the respective phase, in this case the high-quartz solid solution phase, exhibit such an orientation, preferably at least 75%, and most preferably at least 90%.

Such a configuration can be achieved, for example, by directed crystal growth occurring near the surface. This is made possible, for example, through specific temperature control, in particular during cooling, in particular with a cooling temperature in a range of not more than 20° C. around $T_g$. The cooling is part of the ceramization process and encompasses the range of temperature control during which cooling occurs from the maximum temperature to room temperature or to the removal temperature from the furnace. In other words, surprisingly, it is possible in a simple manner to modify the ceramization process by adjusting the cooling process in such a way that directional crystal growth is generated.

Another aspect of the present disclosure relates to the use of a glass ceramic article according to embodiments and/or aspects of the present disclosure as protective glass for a mobile terminal and/or as a cover sheet, in particular as a cover sheet for entertainment electronics devices, in particular for display devices, screens of computer devices, measurement devices, TV sets, and/or in particular as a cover sheet for mobile devices, in particular for at least one device selected from the group comprising: mobile terminals, mobile data processing devices, in particular cell phones, mobile computers, palmtops, laptops, tablet computers, wearables, wearable watches, and time measuring devices, or as protective glazing, in particular protective glazing for machines, or as glazing in high-speed trains, or as safety glazing, or as automotive glazing, or in diving watches, or in submarines, or as a cover plate for explosion-proof devices.

Yet another aspect of the present disclosure relates to a method for producing a glass ceramic article, preferably a glass ceramic article according to the first aspect, comprising the steps of: providing a starting material comprising a ceramizable glass and/or a glass ceramic material; preferably performing a thermal treatment to generate crystallization nuclei at a temperature $T_{KB}$ over a duration $t_{KB}$; preferably performing a thermal treatment for crystallizing a crystalline precursor phase at a temperature $T_{KV}$ over a duration $t_{KV}$; and performing a thermal treatment for crystallizing in particular keatite solid solution at a temperature $T_{KK}$ over a duration $t_{KK}$; wherein the duration $t_{KK}$ is determined based on the expansion of the ceramizable glass and/or of the glass ceramic material, preferably based on the relative percentage expansion thereof.

Highly surprisingly, the inventors have found that the relative change in length of a glass ceramic material is directly related to its scattering behavior, thus providing information on the percentage of scattered light generated by this glass ceramic material, and that this also applies to thicknesses of a sheet-like glass ceramic article of less than 2 mm.

Likewise very surprisingly, the inventors were able to implement a method which, by identifying the relative change in length of a glass ceramic material and by determining predefined points in a curve of the relative change in length, preferably under isothermal temperature exposure, allows to provide durations for thermal treatments, which allow to mitigate or even reduce to a minimum the percentage of scattered light of the glass ceramic material, and this also for thicknesses of a sheet-like glass ceramic article of less than 2 mm.

Particularly advantageously, this method is not limited to certain singular temperatures, but can be performed in defined process windows with large temperature ranges.

Such a method has been described in DE 10 2016 101 066 B3 by way of example, but there for glass ceramics of conventional thickness, which are also used as so-called hotplates or cooking surfaces, for example.

This method also makes it possible, in a simple way, to provide the necessary process parameters for a given glass ceramic material only on the basis of dilatometer measurements, independently of further chemical or physical analyses.

Preferably, the duration $t_{KK}$ is determined as the duration up to which the relative change in length of the glass ceramic material or of a sample of the glass ceramic material at a given temperature $T_{KK}$ assumes a maximum value, and the duration $t_{KK}$ preferably starts at $t_{heating}$, the point in time at which the glass ceramic material has reached the maximum temperature $T_{KK}$ which is also held isothermal from this point in time, and ends at the point in time at which the relative change in length of the glass ceramic material or of the sample of the glass ceramic material has reached its maximum.

In a further embodiment, the duration $t_{KK}$ starts at $t_{heating}$, that is the point in time at which the glass ceramic material or a sample of the glass ceramic material has reached the maximum temperature $T_{KK}$ which is also held isothermal from this point in time, and the end of the thermal treatment duration $t_{KK}$ for a given temperature $T_{KK}$ is in an interval that is determined from a curve of the percentage value of relative change in length of the glass ceramic material or of a sample of the glass ceramic material and two tangents to this curve, wherein one of the tangents is applied to a linear part of a first or second slope of the curve, and the other tangent is applied to a temporally subsequent plateau of the curve, and wherein the thermal treatment duration $t_{KK}$ ends in the middle of an interval $t_{mid}$ which is spanned by the points at which the tangents just no longer touch the curve, as seen from higher temperatures; or the duration $t_{KK}$ ends at the point in time defined by the point of intersection of the tangents, wherein, preferably, $t_{KK}$ does not deviate by more than 30 minutes, more preferably by not more than 20 minutes, most preferably by not more than 10 minutes from the so determined duration.

Preferably, the sum of $t_{KV}$ and $t_{KB}$ including optional heating times is more than 15 minutes and at most 250 minutes, preferably less than 200 minutes, and the total duration of the thermal treatment, calculated as the sum of the thermal treatment durations $t_{KB}+t_{KV}+t_{KK}$ and optional heating times preferably is less than five hours.

In a particularly preferred embodiment, the duration $t_{KK}$ of the thermal treatment for forming keatite solid solution and the temperature $T_{KK}$ are selected from a range which is defined in a temperature-time diagram by the following corner points: 2 min at 1100° C., 2 min at 900° C., 200 min at 850° C., and 200 min at 980° C.

The duration $t_{KK}$ may also be approximated as the duration up to which the relative change in length of the sample of the glass ceramic material or of the glass ceramic material assumes a maximum value at a given temperature $T_{KK}$.

Surprisingly, it could be shown that the temperature control which is necessary for producing such a glass ceramic article according to the first aspect in order to produce the microstructure in a sheet-like product in a controlled manner despite a thickness of less than 2 mm can also be implemented in industrial production processes. This is all the more surprising since it was actually expected that a minimum thickness of 3 mm or even 4 mm is necessary in order to ensure selective and controlled heating of such a sheet-like article across its volume. A prerequisite for the selective and controlled heating of a body with a thickness of less than 2 mm across its volume is the adjustment of the so-called bottom and top heat, i.e. the temperatures that act simultaneously on the lower side and upper side of the sheet-like glass ceramic article according to the first aspect. Depending on the actual thickness of this sheet-like embodiment in the range of less than 2 mm thickness, an adjustment of the lower and upper heat may be necessary in a range from −5 K to +8 K in order to ensure heating of the glass ceramic article according to the first aspect across its volume, which, with a thickness of less than 2 mm, is very thin in comparison to the common and conventional sheet-like glass ceramic articles, as mentioned above, so that the crack-deflecting microstructure can be obtained. Thus, in other words, surprisingly, only minor adjustments are necessary to the method known for conventional thicknesses of a glass ceramic article having a composition according to the first aspect, as described in DE 10 2016 101 066 B3, for example, in order to produce thinner glass ceramic articles which have a similar, very advantageous microstructure with a crack-deflecting effect, as mentioned above.

Yet another aspect of the present disclosure relates to a method for producing a glass ceramic article, preferably a glass ceramic article according to the second to fourth aspects of the present disclosure, comprising the steps of: providing a starting material comprising a ceramizable glass and/or a glass ceramic material; preferably performing a thermal treatment to generate crystallization nuclei at a temperature in the range from 300 to 800° C. and over a duration of 10-300 min; preferably performing a thermal treatment for volume crystallization in a range from 500 to 1200° C. for a duration of 10-300 min, wherein the heat treatment between the interval for generating crystallization nuclei and the interval for volume crystallization may be performed at heating rates of 0.1 to 50 K/min; and cooling to room temperature at a cooling rate of 1 to 100 K/min.

Optionally, further steps may follow, such as ion exchange steps, as already mentioned above.

DETAILED DESCRIPTION

Figure 1:
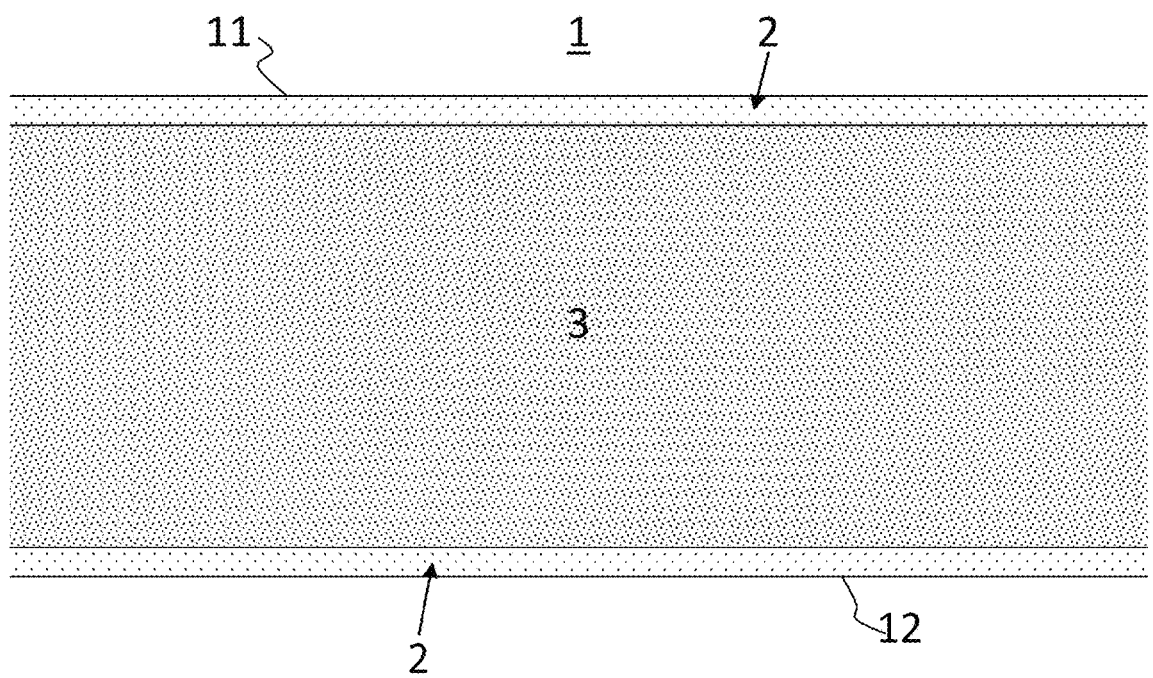
FIG. 1 is a schematic view, not drawn to scale, showing a section through a sheet-like glass ceramic article.

FIG. 1 is a schematic view showing a section through a sheet-like glass ceramic article 1 according to embodiments.

According to the first aspect of the present disclosure, the glass ceramic article 1 may, for example, have a coefficient of thermal expansion a of less than $1.5*10^{-6}$/K, in the range from 20° C. to 700° C. A first microstructure 2 is provided on each of the surfaces 11, 12 of the article 1. This microstructure extends inwardly from the surface 11 or 12 towards the core 3 and has a thickness $d_1$. The core 3 defines a second microstructure which has a thickness dz.

The first microstructure 2 differs from the second microstructure (or core) 3 by the type and/or the amount and/or the size distribution and/or the orientation and/or the composition of the crystalline phases and/or crystals included in the respective microstructure, and/or by the type and/or the percentage amount and/or the composition of an amorphous, for example glassy phase. As a result, there is a difference in the resulting coefficients of linear thermal expansion of the first microstructure 2 and the second microstructure 3, the coefficient of linear thermal expansion of the first microstructure 2 preferably being lower than the coefficient of linear thermal expansion of the second microstructure 3.

More generally, without being limited to a specific aspect of the present specification, the coefficient of thermal expansion of the first microstructure may be between $-3*10^{-6}$/K and $+3*10^{-6}$/K according to one embodiment. Furthermore, according to one embodiment, the coefficient of thermal expansion of the second microstructure may generally be between $1.5*10^{-6}$/K and $8*10^{-6}$/K, without being limited to a specific aspect of the present disclosure.

For a glass ceramic article according to the second aspect, for example, the coefficient of thermal expansion of the first microstructure may be designed to be greater than 0, for example about $1.13*10^{-6}$/K, and the coefficient of thermal expansion of the core or second microstructure may be about $2*10^{-6}$/K. The first microstructure may have a thickness of 70 µm, for example. However, it is also possible that the glass ceramic article according to the second aspect is designed such that the coefficient of thermal expansion is even below 0, for example about $-0.023*10^{-6}$/K, and that the coefficient of thermal expansion of the core or second microstructure is about $2*10^{-6}$/K or more, for example $2.2*10^{-6}$/K. The thickness of the first microstructure may, for example, also be more than 70 µm, such as 130 µm. The coefficients of thermal expansion may again change in the glass ceramics or glass ceramic articles according to the second aspect, in particular in the first microstructure, when the ion exchange effect is taken into account. That is because the potassium ion that is diffusing in is larger than the exchanged sodium ion. However, these expansion coefficients are very difficult to measure. For example, compressive stresses may be greater than 70 MPa here, such as 74 MPa, or greater than 200 MPa, such as about 205 MPa for a thickness of about 1.9 mm, about 190 MPa for a thickness of 1 mm, about 160 MPa for a thickness of 0.5 mm. Depending on the exact composition, however, these values may also differ so that, for example, a compressive stress of about 73 MPa may result on the surface for a thickness of approximately 1.9 mm, about 73 MPa for a thickness of approximately 1 mm, about 66 MPa for a thickness of about 0.5 mm.

This must also be taken into account for the coefficients of thermal expansion of a glass ceramic article according to the third aspect. If the thermal expansion coefficients of surface layer 2 and of core 3 of the non-ion-exchanged glass ceramic article are given, the result is an expansion coefficient of about $11.9*10^{-6}$/K for the first microstructure 2 here, and of $10.5*10^{-6}$/K for the second microstructure 3. However, this will be different in the ion-exchanged state, and furthermore, with the resulting compressive stress caused by the ion exchange, there will be no tensile stress resulting on the surface in this case either, but rather a compressive stress. Therefore, to be more correct, the coefficient of thermal expansion would have to be replaced here by a "chemical expansion coefficient" which, however, cannot be determined metrologically or only with difficulty, as already mentioned above. The first microstructure 2 may have a thickness of more than 10 µm, for example, depending on the precise conditions of the ion exchange, for example 18 μm Greater thicknesses are also conceivable and possible.

For a glass ceramic article according to the fourth aspect, for example, a resulting coefficient of thermal expansion of approximately $-1.67*10^{-6}$/K can be obtained in a direction perpendicular to the surface, for example, and of $0.33*10^{-6}$/K in the direction parallel to the surface, by the targeted directional crystallization in a near-surface area, that is in the first microstructure 2, which may have a thickness of about 20 μm, for example, in particular for a lithium-rich high-quartz solid solution as the crystal phase. In the bulk, a coefficient of thermal expansion of about $0.34*10^{-6}$/K is resulting in this case. In this way, the compressive stress on the surface can be adjusted to be up to 205 MPa or even more, for example. However, depending on the precise implementation, other values are also possible here, which may also vary with the thickness of the glass ceramic article 1. For example, a compressive stress of approximately 90 MPa may result on the surface for a thickness of about 1.9 mm, approximately 88 MPa for a thickness of about 1 mm, and approximately 85 MPa for a thickness of 0.5 mm.

Figure 2:
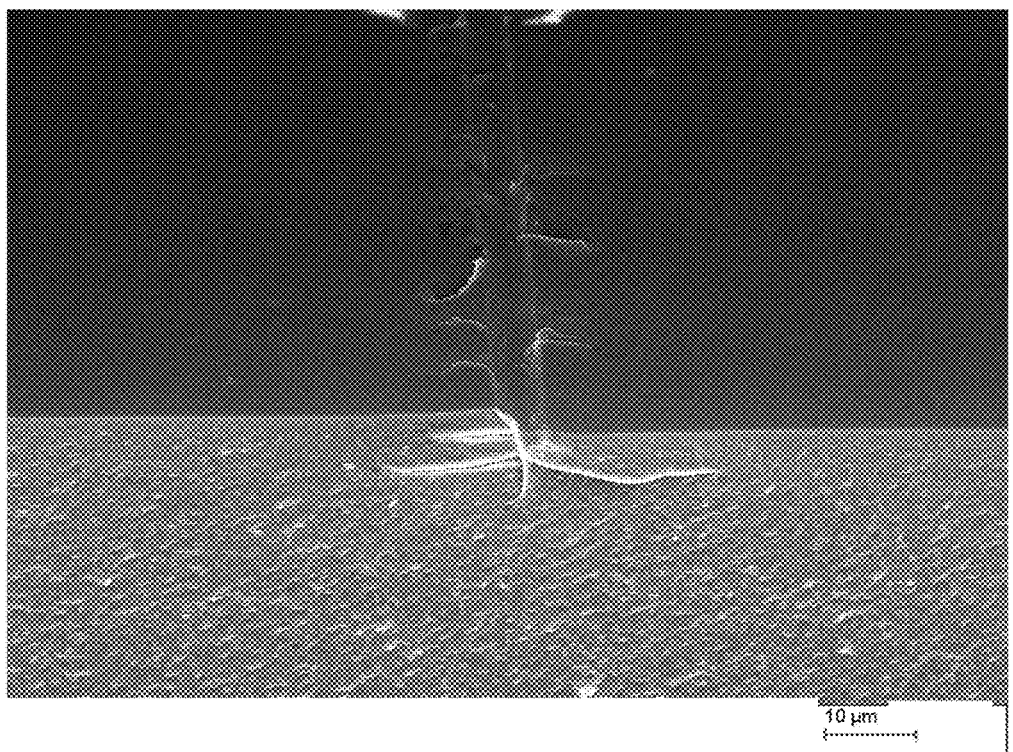
FIG. 2 shows a scanning micrograph of an exemplary glass ceramic article, illustrating crack deflection.

FIG. 2 shows a scanning micrograph of an exemplary glass ceramic article, illustrating crack deflection. This was obtained for a glass ceramic article with a composition according to the first aspect here, but with a greater thickness. As can be seen, the crack does not extend across the glass ceramic, but is deflected. As mentioned above, this highly advantageous microstructure was surprisingly also obtained for glass ceramics or glass ceramic articles of a different thickness and optionally different composition.

LIST OF REFERENCE NUMERALS

1 Sheet-like glass ceramic article
11 Upper surface of glass ceramic article
12 Lower surface of glass ceramic article
2 First microstructure
3 Core, second microstructure

What is claimed is:

1. A glass ceramic article, comprising:
a sheet having surfaces with a thickness between the surfaces between 0.5 mm and 1.9 mm;
a core located between the surfaces;
a first microstructure provided on each of the surfaces, the first microstructure extending inwardly from the surfaces towards the core and has a first thickness ($d_1$); and
a second microstructure in the core with a second thickness ($d_2$);
wherein the first microstructure has a difference from the second microstructure selected from a group consisting of: a crystalline phase type, a crystalline phase amount, crystalline phase size distribution, crystalline phase orientation, crystalline phases composition, crystalline inclusion, an amorphous phase type, an amorphous phase percentage amount, an amorphous phase composition, and any combinations thereof,
wherein the difference results in a first coefficient of linear thermal expansion of the first microstructure that is smaller than a second coefficient of linear thermal expansion of the second microstructure such that a compressive stress zone is present between the first and second microstructures, and
wherein the glass ceramic article comprises a glass ceramic material that contains no more than 0.035 wt % of color-imparting oxides.

2. The glass ceramic article of claim 1, further comprising an optical transmittance ($\tau_{vis}$) of at least 85% at a measurement thickness of 1 mm.

3. The glass ceramic article of claim 1, further comprising scattering, determined in transmission, that is not more than 3% at a glass measurement thickness of 1 mm.

4. The glass ceramic article of claim 1, further comprising a crack initiation load (CIL) between 0.5 N and 1.0 N.

5. The glass ceramic article of claim 4, wherein the crack initiation load (CIL) is determined at a glass measurement thickness of 1.9 mm.

6. The glass ceramic article of claim 1, wherein at least one of the surfaces is polished and has a roughness of not more than 0.2 nm (RMS, Ra).

7. The glass ceramic article of claim 1, wherein the glass ceramic material comprises constituents, in wt %:

| | |
|---|---|
| $Al_2O_3$ | 18 to 23 |
| $Li_2O$ | 2.5 to 4.2 |
| $SiO_2$ | 60 to 69 |
| ZnO | 0 to 2 |
| $Na_2O$ | 0 to 1.5 |
| $K_2O$ | 0 to 1.5 |
| $Na_2O + K_2O$ | 0.2 to 1.5 |
| MgO | 0 to 1.5 |
| CaO + SrO + BaO | 0 to 4 |
| $B_2O_3$ | 0 to 2 |
| $TiO_2$ | 2 to 5 |
| $ZrO_2$ | 0.5 to 2.5 |
| $P_2O_5$ | 0 to 3 |
| $SnO_2$ | 0 to less than 0.6, and a total of $TiO_2 + ZrO_2 + SnO_2$ that amounts to between 3.8 and 6 wt %. |

8. The glass ceramic article of claim 7, wherein the lanthanide is Nd.

9. The glass ceramic article of claim 1, wherein the first microstructure comprises high-quartz solid solution as a first main crystal phase and/or wherein the second microstructure comprises keatite solid solution as a second main crystal phase.

10. The glass ceramic article of claim 9, wherein the first main crystal phase has a crystallite size from 0.01 μm to 0.1 μm and/or the second main crystal phase has a crystallite size from 0.05 μm to 0.8 μm.

11. The glass ceramic article of claim 1, wherein the glass ceramic material comprises constituents, in wt %:

| | |
|---|---|
| $SiO_2$ | 45 to 62 |
| $Al_2O_3$ | 20 to 40 |
| MgO | 5 to 16 |
| $Li_2O$ | 0.3 to 6 |
| $TiO_2$ | 0 to 10 |
| $MoO_3$ | 0 to 0.1 |
| $ZrO_2$ | 0 to 4 |
| $B2O_3$ | 0 to 1 |
| $P_2O_5$ | 0 to 1 |
| $Nd_2O_5$ | 0 to 0.1. |

12. The glass ceramic article of claim 11, wherein the glass ceramic material further comprises a constituent selected from a group consisting of $WO_3$, $SnO_2$, $Ta_2O_5$, $Nb_2O_5$, $As_2O_3$, and any mixtures thereof.

13. The glass ceramic article of claim 11, wherein the glass ceramic material comprises:
high-quartz solid solution as a main crystal phase with a crystal phase that is at least 45 vol % and at most 90 vol %; and a fraction of amorphous phase that is at least 10 vol % and at most 55 vol %,
wherein the first microstructure has a higher lithium content than the second microstructure.

14. The glass ceramic article of claim 1, wherein the glass ceramic material comprises constituents, in wt %:

| | |
|---|---|
| $Al_2O_3$ | 10 to 40 |
| CaO + BaO + MgO | 0 to 18 |
| $Na_2O + K_2O$ | 5 to 40 |
| $SiO_2$ | 25 to 75 |
| $TiO_2$ | less than 10 |
| $ZrO_2$ | less than 10. |

15. The glass ceramic article of claim 14, wherein the glass ceramic material comprises nepheline or a nepheline crystal phase as a main crystal phase, wherein the first microstructure has an increased potassium content compared to the second microstructure and/or the first microstructure has a crystal phase content that is different from that of the second microstructure.

16. The glass ceramic article of claim 1, wherein the glass ceramic material comprises constituents, in wt %, on an oxide basis:

| | |
|---|---|
| $Li_2O$ | 3.0 to 4.5 |
| $Na_2O$ | 0 to 1.5 |
| $K_2O$ | 0 to 1.5 |
| $Na_2O + K_2O$ | 0.2 to 2.0 |
| MgO | 0 to 2.0 |
| CaO | 0 to 1.5 |
| SrO | 0 to 1.5 |
| BaO | 0 to 2.5 |
| ZnO | 0 to 2.5 |
| $B_2O_3$ | 0 to 1.0 |
| $Al_2O_3$ | 19 to 25 |
| $SiO_2$ | 55 to 69 |
| $TiO_2$ | 1.4 to 2.7 |
| $ZrO_2$ | 1.3 to 2.5 |
| $SnO_2$ | 0 to 0.4 |
| $SnO_2 + TiO_2$ | less than 2.7 |
| $P_2O_5$ | 0 to 3.0 |
| $ZrO_2 + 0.87(TiO_2 + SnO_2)$ | 3.65 to 4.3. |

17. The glass ceramic article of claim 16, wherein the glass ceramic material comprises:
high-quartz solid solution as a main crystal phase with a crystal phase fraction that is at least 45 vol % and at most 90 vol %; and
a fraction of amorphous phase of at least 10 vol % and at most 55 vol %,
wherein the first microstructure has crystals that are oriented in a directional manner and the second microstructure has crystals that are oriented randomly.

18. The glass ceramic article of claim 1, wherein the glass ceramic article is configured for a use selected from a group consisting of: a protective glass for a mobile terminal, a cover sheet for an entertainment electronics device, a cover sheet for a display device, a cover sheet for a computer screen, a cover sheet for a measurement device, a cover sheet for a TV set, a cover sheet for a mobile device, a cover sheet for a mobile terminal, a cover sheet for a mobile data processing device, a cover sheet for a cell phone, a cover sheet for a mobile computer, a cover sheet for a palmtop, a cover sheet for a laptop, a cover sheet for a tablet computer, a cover sheet for a wearable computing device, a cover sheet for a watch, a cover sheet for a time measuring device, a protective glazing for a machine, a protective glazing for a high-speed train, a safety glazing for an automobile, a safety glazing for a diving watch, a safety glazing for a submarine, and a cover plate for an explosion-proof device.

19. The glass ceramic article of claim 1, wherein the color-imparting oxides are selected from a group consisting of $MnO_2$ $V_2O_5$, $MoO_x$, NiO, $Cr_2O_3$, $Nd_2O_3$, CoO, and any combination thereof.

20. The glass ceramic article of claim 1, wherein the color-imparting oxides comprise a total of at most 0.01 wt %.

21. A glass ceramic article, comprising:
a sheet having surfaces with a thickness between the surfaces between 0.5 mm and 1.9 mm;
a core located between the surfaces;
a first microstructure provided on each of the surfaces, the first microstructure extending inwardly from the surfaces towards the core and has a first thickness ($d_1$); and
a second microstructure in the core with a second thickness ($d_2$);
wherein the first microstructure has a difference from the second microstructure selected from a group consisting of: a crystalline phase type, a crystalline phase amount, crystalline phase size distribution, crystalline phase orientation, crystalline phases composition, crystalline inclusion, an amorphous phase type, an amorphous phase percentage amount, an amorphous phase composition, and any combinations thereof,
wherein the difference results in a first coefficient of linear thermal expansion of the first microstructure that is smaller than a second coefficient of linear thermal expansion of the second microstructure such that a compressive stress zone is present between the first and second microstructures, and
wherein the glass ceramic article is non-colored.

22. A glass ceramic article, comprising:
a sheet having surfaces with a thickness between the surfaces between 0.5 mm and 1.9 mm;
a core located between the surfaces;
a first microstructure provided on each of the surfaces, the first microstructure extending inwardly from the surfaces towards the core and has a first thickness ($d_1$); and
a second microstructure in the core with a second thickness ($d_2$);
wherein the first microstructure has a difference from the second microstructure selected from a group consisting of: a crystalline phase type, a crystalline phase amount, crystalline phase size distribution, crystalline phase orientation, crystalline phases composition, crystalline inclusion, an amorphous phase type, an amorphous phase percentage amount, an amorphous phase composition, and any combinations thereof,
wherein the difference results in a first coefficient of linear thermal expansion of the first microstructure that is smaller than a second coefficient of linear thermal expansion of the second microstructure such that a compressive stress zone is present between the first and second microstructures, and
wherein the glass ceramic article comprises a glass ceramic material that contains no more than 0.1 wt % of color-imparting oxides and is free of at least one of $V_2O_5$ and $Fe_2O_3$.

* * * * *